Jan. 25, 1955  R. M. HEINTZ  2,700,740
ELECTRIC BRUSH HOLDER
Filed April 20, 1953  2 Sheets-Sheet 1
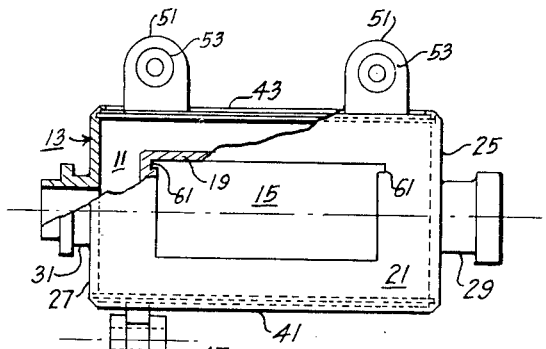
Fig.1.
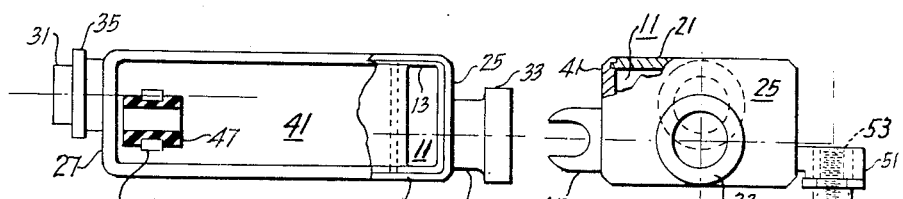
Fig.2.  Fig.3.
Fig.4.  Fig.5.
INVENTOR.
Ralph M. Heintz
BY Lippincott & Smith
ATTORNEYS Jan. 25, 1955
R. M. HEINTZ
2,700,740
ELECTRIC BRUSH HOLDER
Filed April 20, 1953
2 Sheets-Sheet 2
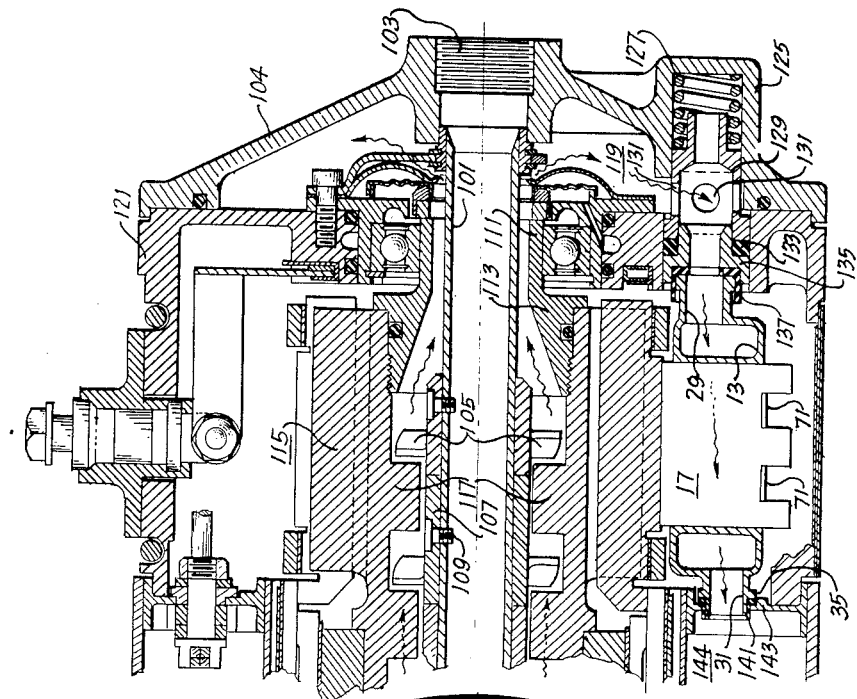
INVENTOR.
Ralph M. Heintz
BY
Lippincott & Smith
ATTORNEYS United States Patent Office 2,700,740
Patented Jan. 25, 1955

2,700,740

ELECTRIC BRUSH HOLDER

Ralph M. Heintz, Los Gatos, Calif., assignor to Jack & Heintz, Inc., Cleveland, Ohio, a corporation of Delaware Application April 20, 1953, Serial No. 349,631

3 Claims. (Cl. 310—227)

The present invention relates generally to brush holder structure admitting of coolant circulation therethrough. The brush holder comprises a hollow fluid conduit of generally loop configuration to embrace a brush to be cooled, fluid inlet and outlet connections being provided in communication with the hollow conduit.

The brush holder is adapted to be inserted in a coolant path provided in a dynamo-electric machine, one fluid connection to the hollow conduit being seated against the machine frame comprising a portion of a coolant pasageway, and the other fluid connection to the hollow conduit being in communication with a further portion of the passageway through fluid conveying plunger means. Resilient means located between the frame and plunger means insures substantially fluid tight coupling to the inlet and outlet connections through force exerted against the plunger means. The embraced brush is thus positioned in suitable orientation with the remaining components of the machine.

Further description of the present invention may be facilitated by considering, for example, its incorporation in the Liquid Cooled Dynamo-Electric Machine as presented in an application for Letters Patent of the United States, Serial No. 349,634, filed concurrently herewith by the same inventor. It will, however, be understood that the present invention possesses utility beyond the incorporation presented for convenience of description, the brush holder structure being applicable to fluid cooled dynamo-electric machines in general.

In a machine admitting of liquid cooling, the coolant should not have access to the air gap provided between the rotor and stator structures. Thus, it is essential that the coolant path be substantially hermetically sealed. This is effectively achieved if the fluid inlet and outlet connections to the brush holding conduit are arranged substantially opposite to one another thereby permitting the resilient means to act between the frame and brush-embracing conduit via the plunger assembly. It should be immediately apparent that the plunger means may be in direct communication with either the inlet or outlet connection on the hollow conduit, the resilient means serving in either case to insure tight fittings.

Once the hollow conduit is fixed to the frame of the machine by the plunger means, a brush is merely nested within the conduit to rest on the commutator, being biased thereagainst by suitable spring clips supported from the conduit exterior in a manner similar to conventional practice. Preferably, the brush fits rather snugly within the conduit which is formed of metal of relatively high thermal conductivity, such as to transfer the developed heat to the circulating coolant. It should be noted that a brush within the connotation herein employed may comprise one or more segments, permitting a plurality of pigtails to be riveted or otherwise attached respectively to the individual segments. Also, in conventional fashion, a spring steel band or strap may be removably secured about a section of the periphery of the machine to permit access to the brushes when necessary.

In the aforementioned application, a hollow shaft comprising the rotor-supporting structure is suitably supported for rotation in bearings carried by the machine frame, one of the bearings being located in an end bell which is also provided with bosses each capable of receiving a portion of the plunger means of the individual brush holder structures. Within the rotatable hollow shaft, there is located a fixed hollow shaft in communication with a central fluid inlet coupling for the machine. Pump vanes are provided within the hollow shaft to co-act with vanes extending externally of the fixed shaft to form a pump capable of circulating the coolant within the machine. Apertures are formed in the fixed shaft to permit fluid introduced through the machine inlet coupling to be drawn therethrough into the pump and impelled along a passageway isolated from the gap and in communication with the fluid conveying plunger means of each brush structure employed. The coolant thus passes through the plunger means and about each brush via the hollow conduit embracing the same, and thence to the stator structure for circulation and subsequent discharge from the machine.

Each of the plunger means comprises a hollow plunger member slidably mounted within an end bell boss. An annular floating gasket socket, suitably recessed to accommodate an electrically insulating gasket fitting the conduit inlet connection which may conveniently be tubular, abuts the plunger member. Likewise, a suitable insulating gasket is located between the outlet connection of the hollow brush-holding conduit and the portion of the machine frame defining the coolant passageway to the stator structure. The plunger biasing means is located within the end bell boss to bear against the slidable plunger member, thereby compressing the gaskets positioned about the inlet and outlet connections for the brush holding conduit. Thus, each brush holder structure is located in the coolant passageway through the machine in a manner to maintain the passageway continuous and substantially hermetically sealed while introducing only minimum skin friction to the coolant.

Accordingly, among the objects of the present invention are the following: the provision of brush holding structure admitting of coolant circulation therethrough; the provision of such brush holder structure easily incorporable in liquid cooled dynamo-electric machines; and, the provision of such brush holding structure substantially sealed against fluid leakage in a manner admitting of minimum skin friction presented to the circulating coolant.

Other and further objects of the present invention will become apparent to those skilled in the art from a reading of the following detailed description thereof when taken in the light of the accompanying drawings wherein:

Fig. 1 is a view in plan partly broken away to reveal the internal construction of the hollow brush holding conduit and showing the fluid inlet and outlet connections thereto;

Fig. 2 is a view in side elevation of the structure of Fig. 1;

Fig. 3 shows the brush holding conduit and inlet connection thereto in end elevation;

Fig. 4 is a view in side elevation of a suitable spring bracket for maintaining the brushes in operable relation with the machine components;

Fig. 5 shows the structure of Fig. 4 in end elevation;

Fig. 6 is a view partly in transverse section and partly in end elevation of a dynamo-electric machine having incorporated therein brush holding structure in accordance with the present invention; and, Fig. 7 is a fragmentary longitudinal sectional view of the machine of Fig. 6, the plane of section being taken along the line 7—7 of this figure.

In order to insure minimum fluid leakage, the brush holding conduit and inlet and outlet connections thereto may be formed substantially integral. Figs. 1 through 3 show this structure preferably formed by brass casting. A fluid duct or channel 11 is formed by the brush holding conduit 13 which extends in closed loop fashion to define a central opening 15 adapted to fit a brush, generally designated at 17 in Fig. 7. The opening 15 is formed by an inner wall 19 substantially defining a closed rectangle, the wall being cast integral with an upper plate 21 and a lower plate 23 converging into end walls 25 and 27, respectively provided with an inlet connection 29 and an outlet connection 31 shown in tubular form. The inlet and outlet connections are respectively provided with machined flanges 33 and 35 for coupling purposes.

The channel 11 is closed by a leading cover 41 and a trailing cover 43. The end walls 25 and 27 have outer recessed edges (Fig. 1) adapted to be broken over the cover edges and silver soldered to form fluid tight joints. The leading cover 41 is provided with a U-shaped projection 45 adapted to receive an annular insulator 47 which fits a rod 49 extending longitudinally of the machine (Fig. 6). The trailing cover 43 is provided with a pair of projecting lugs 51 each having apertures 53 to accommodate bolts 55 (Fig. 6) secured by nuts 57 for the purpose next to be described.

The inner wall 19 defining the brush opening 15 is provided with a pair of opposed recesses 61 adapted to receive a spacer or upriser 63 (Fig. 4) having riveted thereto a clip 65 (Fig. 5) to define a spring bracket assembly for a pair of coil springs 67. The coil springs 67 are respectively carried by a pair of right angle arms 69 such that the spring extremities or fingers 67' extend over the spacer 63 to bear against an upper brush surfacing or facing member 71 riveted thereto (Fig. 6) to maintain the brush against the machine commutator 73.

Figs. 6 and 7 show the brush holder structure assembled and applied to a dynamo-electric machine of the D. C. generator variety. The brush holder structure is alined longitudinally of the commutator 73 by the rod or bolt 49 extending through the annular insulator 47 set within the U-shaped projection 45 of the leading cover 41. The spring bracket upriser or spacer 63 is fitted within the recesses 61 (Fig. 1) and the clip 65 is secured to the apertured lugs 51 by the bolts 55 passing through the apertures 81 (Fig. 5) provided therein. After the facing members 71 are secured to the brush segments and the latter are deposited within the openings 15, the spring fingers 67' are then placed against the brush facing members 71 in the brush slanting recesses provided therefor, best shown in Fig. 7, to maintain the brushes against the commutator. The projecting lugs 51 also support a pair of clamp arms 83 adapted to receive the pigtails 85. Brush leads 91, also secured to the lugs 51 by the bolts 55, extend outwardly of the brush structure to permit electrical attachment in conventional fashion, clamps 93 being provided for use as shunt field connectors if desired.

Fig. 7 shows in section a sufficient portion of a D. C. generator incorporating brush holder structure in accordance with the present invention to illustrate the attachment and operation thereof. A fixed hollow shaft 101 is secured in the frame of the machine in communication with an external fluid connection 103 formed in an end bell 104 and adapted to admit liquid coolant to the machine. Helicoidal vanes 105 are mounted on the fixed shaft 101 by a sleeve 107 secured thereto through the counter set screws 109. A bearing 111 journaled in the machine frame is adapted to receive the outboard end 113 of a hollow rotatable shaft 115 provided with inwardly extending circumferential rows of vanes 118 adapted to cooperate with the vanes 105 carried by the fixed shaft 101 in forming a coolant pump. The coolant is drawn through the fixed shaft 101 and passes outwardly thereof through apertures in the remote end (not shown) to the pump which forces it back along the outside of the fixed shaft and into the space or passageway 119 between the end bell 104 and a spacer cage 121.

The end bell 104 is provided with a plurality of bosses 125 equal in number to the brushes to be employed in the machine. A coil spring 127 is compressed within each of the bosses 125 to permit a plunger member 129 to be slidably located within the inner end of the boss.

The plunger member 129 is in the form of a cylinder having a plurality of peripherally disposed apertures 131 opening into the hollow interior thereof. Beyond the apertures, the inner end of the plunger member 129 slides into a bore in spacer cage 121 compressing a plastic or neoprene seal ring 133 against a flange on a floating gasket holder 135, one end of the floating gasket 135 fitting slidingly within the seal ring 133 and plunger member 129. The other end of the floating gasket holder 135 is counterbored to receive an insulating gasket 137 within which is fitted the flange 33 (Fig. 2) machined on the inlet connection 29 of the conduit 13. The flange 35 on the outlet connection 31 bears against an insulating gasket 141 set in an orifice in an annular closure 143 secured to the machine frame, which terminates fluid passageway 144 through the frame of the machine. Thus, it may be appreciated that spring 127 in urging plunger member 129 to the left in Fig. 7 serves to compress the seal ring 133, gaskets 137 and 141 to maintain a hermetically sealed structure through which the coolant may circulate to receive heat from the brushes 17.

What is claimed is:

1. Brush holder structure for a dynamo-electric machine having coolant passageways within the frame thereof comprising, in combination, a hollow fluid conduit of closed loop configuration within which a brush to be cooled is adapted to be contained, a fluid inlet connection and a fluid outlet connection in communication with the fluid conduit, fluid conveying plunger means in communication with one of the connections and a passageway of the machine, resilient means supported by the machine frame to maintain the plunger means tightly against said one connection and the other of said connections in fluid tight relation with a further passageway in said machine frame.

2. Brush holder structure adapted for positioning between a pair of fluid passageways formed in the frame of a dynamo-electric machine comprising in combination, a hollow fluid conduit of closed loop configuration adapted to embrace a brush to be cooled, a fluid inlet connection in communication with the fluid conduit, a fluid outlet connection in communication with the conduit and spaced substantially opposite to the inlet connection, fluid conveying plunger means in communication with the inlet connection and one of the pair of fluid passageways in the machine frame, the fluid outlet connection being in communication with the other of said pair of fluid passageways in the machine frame, and spring means adapted to be supported by the frame to bear against the plunger means and maintain fluid tight relation between the inlet and outlet connections and the frame passageways.

3. Brush holder structure to complete fluid communication between passageways in the frame of a dynamo-electric machine comprising a hollow fluid conduit to convey fluid about a brush to be cooled, a pair of substantially oppositely spaced fluid connections respectively in communication with the fluid conduit, fluid conveying plunger means in communication with one of the fluid connections and a passageway in the machine frame, the other of the fluid connections being in communication with a further passageway in the machine frame, and resilient means effective against the plunger to maintain substantially fluid tight relationship between the brush holder structure and the machine frame passageways.

References Cited in the file of this patent

UNITED STATES PATENTS 1,066,175   Barry ------------------ July 1, 1913